J. C. TIFFANY.
System of Gearing for Gasometers.

No. 163,548. Patented May 18, 1875.

Attest:
Jn? L Coombs
A. H. Norris

Inventor,
Joseph C. Tiffany,
By James L. Norris.
Atty

UNITED STATES PATENT OFFICE.

JOSEPH C. TIFFANY, OF PORTSMOUTH, NEW HAMPSHIRE.

IMPROVEMENT IN SYSTEMS OF GEARING FOR GASOMETERS.

Specification forming part of Letters Patent No. 163,548, dated May 18, 1875; application filed April 16, 1875.

*To all whom it may concern:*

Be it known that I, JOSEPH C. TIFFANY, of Portsmouth, in the county of Rockingham and State of New Hampshire, have invented certain new and useful Improvements in System of Gearing, of which the following is a specification:

This invention relates to certain improvements in apparatus for counterbalancing gasometers or gas-holders, and is principally designed for use in connection with oil-gas works, and for private and other small establishments.

In the manufacture of gas it is often convenient to have the holder or gasometer act as an exhauster, while at other times it is necessary to apply considerable pressure to the same. In the ordinary method of counterbalancing such holders by weights, simply, such weights have to be made very heavy, causing great labor in handling when relieving or applying pressure to the gasometer.

The object of my invention is to obviate the necessity of using such heavy weights, and to provide a device, by means of which a light weight, that may be readily handled and shifted, may be substituted for the heavy weights heretofore used.

My invention consists in the combination of a train of gearing with the cord or chain by which the gasometer is held, said gearing being constructed in such manner that a weight of one pound attached to one end will counterbalance a weight of two or more at the other end, to which the cord or chain of the gasometer is secured.

Figure 1:
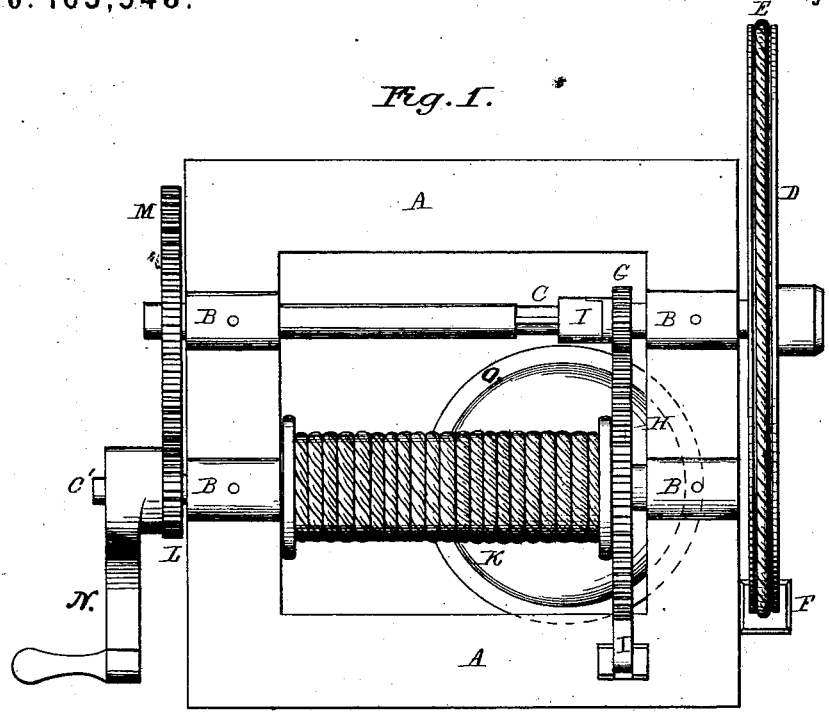
Figure 2:
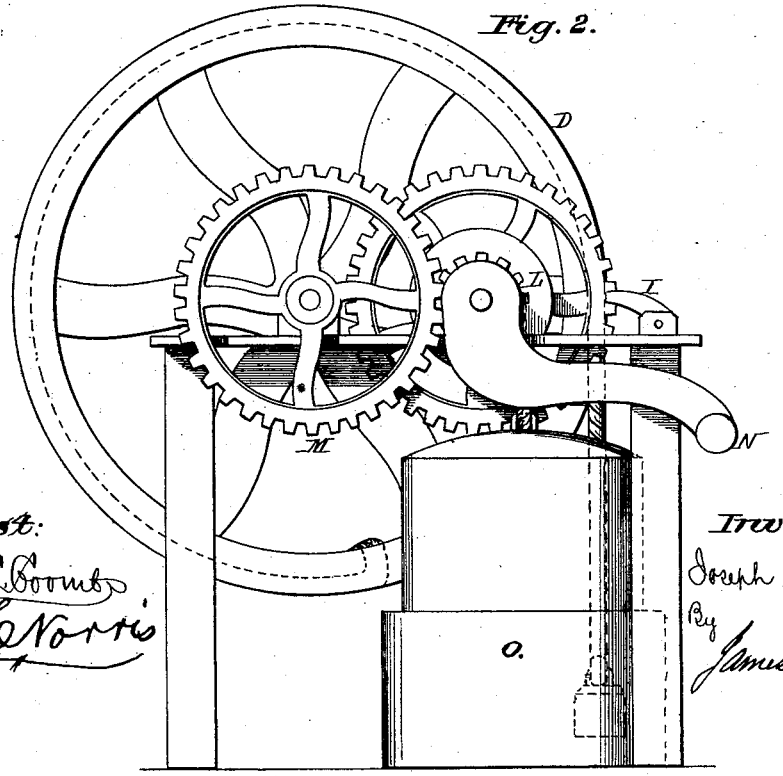

In the drawings, Figure 1 is a top or plan view of my gearing, and Fig. 2 a side elevation.

The letter A represents a strong frame of metal, or other suitable material, carrying the stocks or heads B B, which form the bearings for the shafts C C'. The shaft C is provided with a grooved pulley, D, at one end, to which the cord or chain E, carrying the weight F, is attached. Said shaft is provided with a loose cog-wheel, G, of such diameter as to gear with a larger cog-wheel, H, secured permanently to the shaft C'. The relative sizes of the two wheels will determine the weight necessary at one end to counterbalance the weight at the other end of the train of gearing, as will be readily understood by those skilled in the art of constructing such gearing. The shaft C is provided with a sliding clutch, I, by means of which the wheel G may be caused to revolve with it when required. The shaft C' is provided with a drum, K, to which the cord or chain from the gas-holder is secured. To one end of each shaft is secured a cog-wheel, L M, similar to the wheels G H, with this difference, however, that the larger wheel is attached to the shaft C, and the smaller to the shaft C', said latter shaft having also secured to it a crank, N.

The operation of the machine will be readily understood. The cord from the gas-holder O being secured to the drum K, said holder may be balanced by a weight, the size of which will depend upon the relative diameters of the wheels G and H. By making the difference between these considerable, a very small weight may be employed to balance the holder. The gas-holder, when run down, may be lifted, through the medium of the crank N and gear-wheels L M attached to their respective shafts, the clutch I being released from the shaft C without removing the weight attached to the grooved pulley.

Having thus described my invention, what I claim as new, and desire to secure by Letters Patent, is—

1. The combination, with the gasometer or gas-holder, of a train of multiplying gearing, connected at one end, by a suitable cord, with the gas-holder, and the other by means of a cord with a suitable weight, to counterbalance said gas-holder, as and for the purposes herein set forth.

2. The combination of the shaft C C', weighted pulley D, and gear-wheels G H, of such relative diameters that a light weight on the pulley will counterbalance a heavy weight at shaft C', substantially as herein described.

In testimony that I claim the foregoing I have hereunto set my hand.

JOSEPH CAPRON TIFFANY.

Witnesses:
C. F. MANNING,
FRANK GAMBET.